INVENTOR.
Anton F. Erickson
BY
His Attorney

United States Patent Office 2,908,358
Patented Oct. 13, 1959

2,908,358
DISK BRAKE

Anton F. Erickson, Dayton, Ohio, assignor to General Motors Corporation, Detroit, Mich., a corporation of Delaware Application November 4, 1955, Serial No. 545,031

3 Claims. (Cl. 188—72)

This invention relates to a disk brake adapted for use on motor vehicles.

An object of the invention is to provide a friction brake of disk type wherein the brake disk is adapted to float freely to a limited extent during the period of initial engagement of the brake elements and is actuated for cooperative engagement with brake shoes by a carrier member that supports the movable shoes in a manner that the carrier is also provided with limited floating movement during the initial period of movement of the brake elements into frictional engagement, the carrier member having sufficient resilience to allow for flexing of the carrier member after the brake elements are brought into initial frictional engagement to allow for movement of the brake shoes supported by the carrier to effect pressure engagement between the brake shoes and the brake disk.

Another object of the invention is to provide a friction brake of the disk type wherein the brake includes a single rotating disk element that is drivingly connected with the axle shaft supporting the wheel of the vehicle by means of a plurality of links disposed tangentially with respect to the brake disk and the wheel axle and pivotally secured to both at each end of the links whereby the brake disk is floatingly supported both axially and radially relative to the wheel axle.

Further objects and advantages of the present invention will be apparent from the following description, reference being had to the accompanying drawings wherein a preferred form of the invention is clearly shown.

In the drawings:

Figure 5 is a cross sectional view taken along line 5—5 of Figure 2 illustrating a parking brake applying mechanism.

Figure 6 is a cross sectional view illustrating a manner of attaching one of the brake shoes to the carrier plate for the same.

Figure 3:
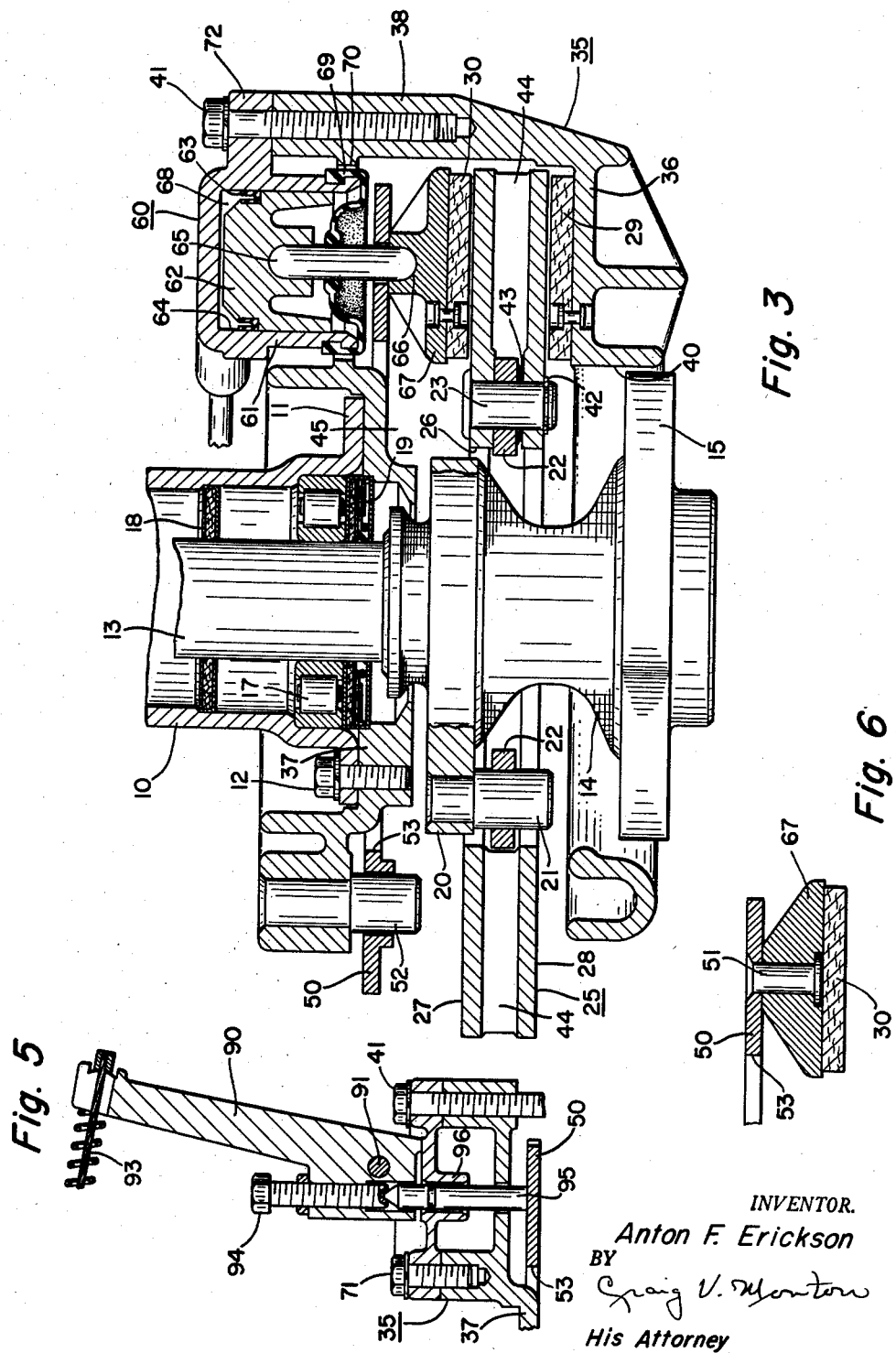
Figure 3 is a cross sectional view taken substantially along line 3—3 of Figure 2.
Figure 4:
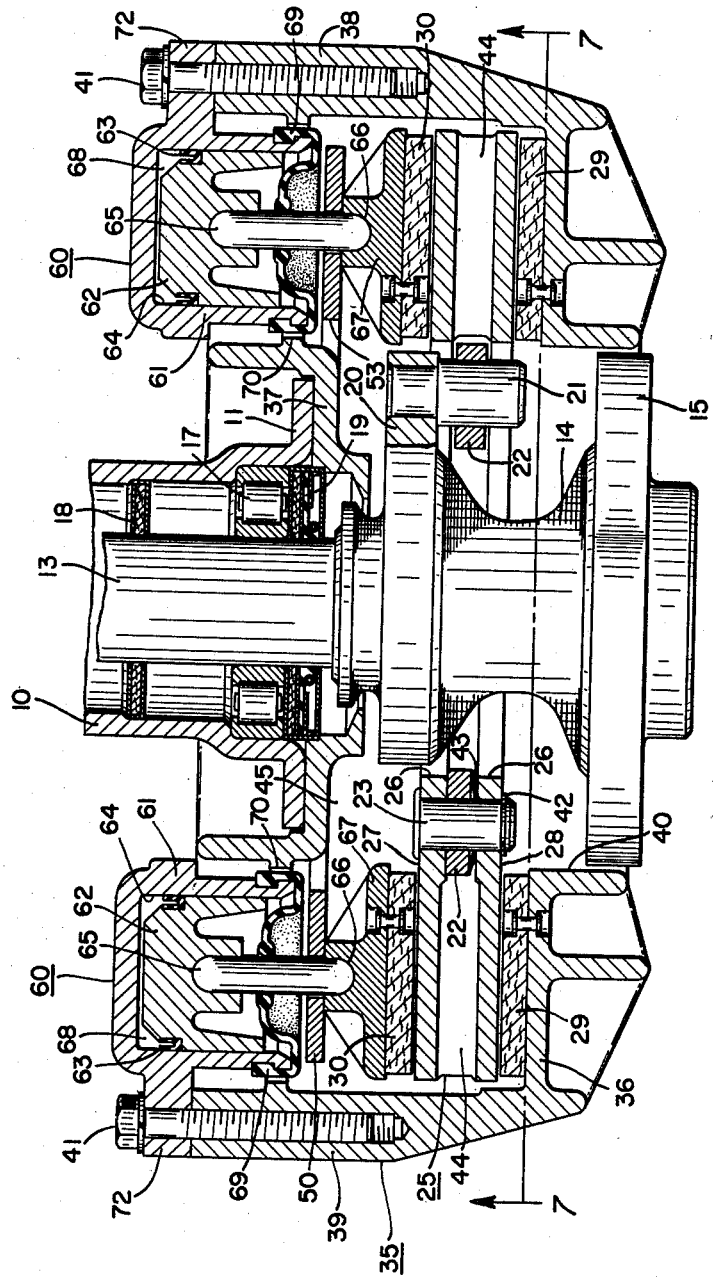
Figure 4 is a cross sectional view taken along line 4—4 of Figure 1.

In Figures 3 and 4 there is illustrated an axle housing 10 that extends from the differential housing of a motor vehicle. The axle housing 10 has a radial flange 11 to which the brake mechanism hereinafter described is secured by means of the bolts 12.

Figure 1:
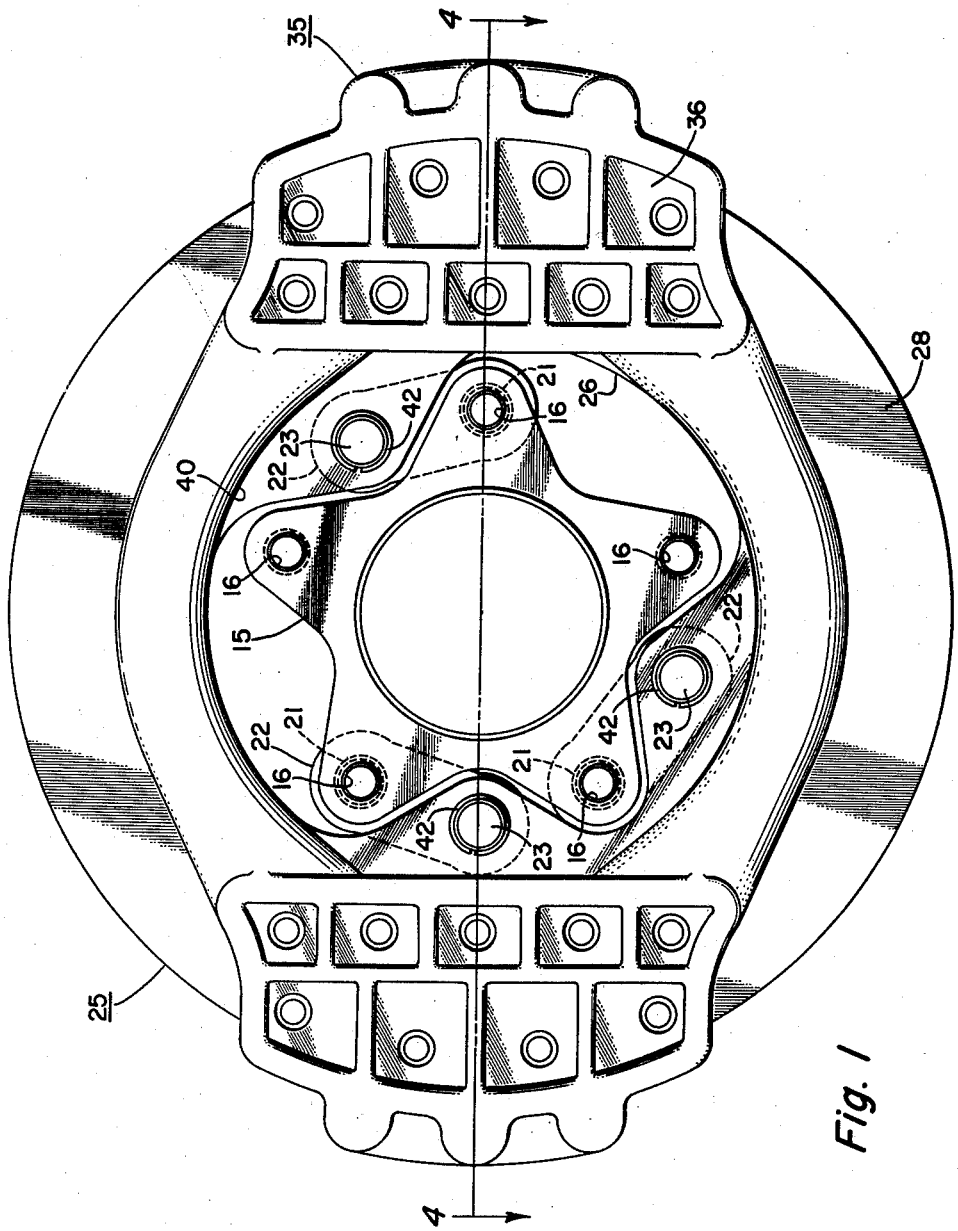
Figure 1 is a front elevational view of the brake of this invention.

An axle 13 extends through the axle housing 10 and has a wheel hub 14 on the outer end thereof. The wheel hub 14 carries a wheel flange 15 to which the wheel of the vehicle is secured in conventional manner by stud bolts (not shown). The wheel flange 15 is in the form of a five pointed star, as shown in Fig. 1 and is provided with the threaded openings 16 adapted to receive stud bolts to secure the wheel disk to the wheel flange.

The axle 13 is supported in the axle housing 10 by means of an anti-friction bearing 17, seals 18 and 19 being provided on opposite sides of the wheel bearing 17 to retain lubricant.

The wheel hub 14 has a second radial flange 20 that is disposed inboard relative to the wheel flange 15. The flange 20 carries a plurality of pins or studs 21 that are fixedly secured to the flange 20. Each of the studs 21 supports one end of a driving link 22 that has the opposite end supported on pins 23 that extend through a brake disk 25.

The brake disk 25 has a central opening 26 that permits the brake disk to be moved outwardly over the wheel flange 15 for removal of the brake disk.

The brake disk 25 is also provided with parallel planar radially disposed faces 27 and 28, the face 28 being adapted to engage stationary brake shoes or friction members 29 while the face 27 is engaged by the movable brake shoe or friction members 30. The stationary friction members 29 or shoes are carried upon a brake housing 35 that has a front wall 36, a rear wall 37 and end walls 38 and 39. The rear wall of the brake housing 35 is secured to the radial flange 11 on the axle housing 10 as hereinbefore described. Thus, the brake housing 35 is stationarily supported on the stationary axle housing 10 with the result that the friction elements or brake shoes 29 are the stationary brake shoes. The front wall 36 of the brake housing is provided with an opening 40 to provide for removal of the front wall portion of the brake housing over the wheel flange 15. The front wall 36 and the end walls 38 and 39 are preferably cast as an integral structure and is attached to the rear wall 37 by means of the bolts 41. The pins 23 that support one end of the drive links 22 are secured in position on the brake disk 25 by means of snap rings 42, and the disk type, or Belleville spring 43 prevents the links 22 from rattling.

The brake disk 25 is provided with a plurality of radial passages 44 to provide for air circulation through the brake disk for dissipation of heat of friction during a braking operation.

Figure 2:
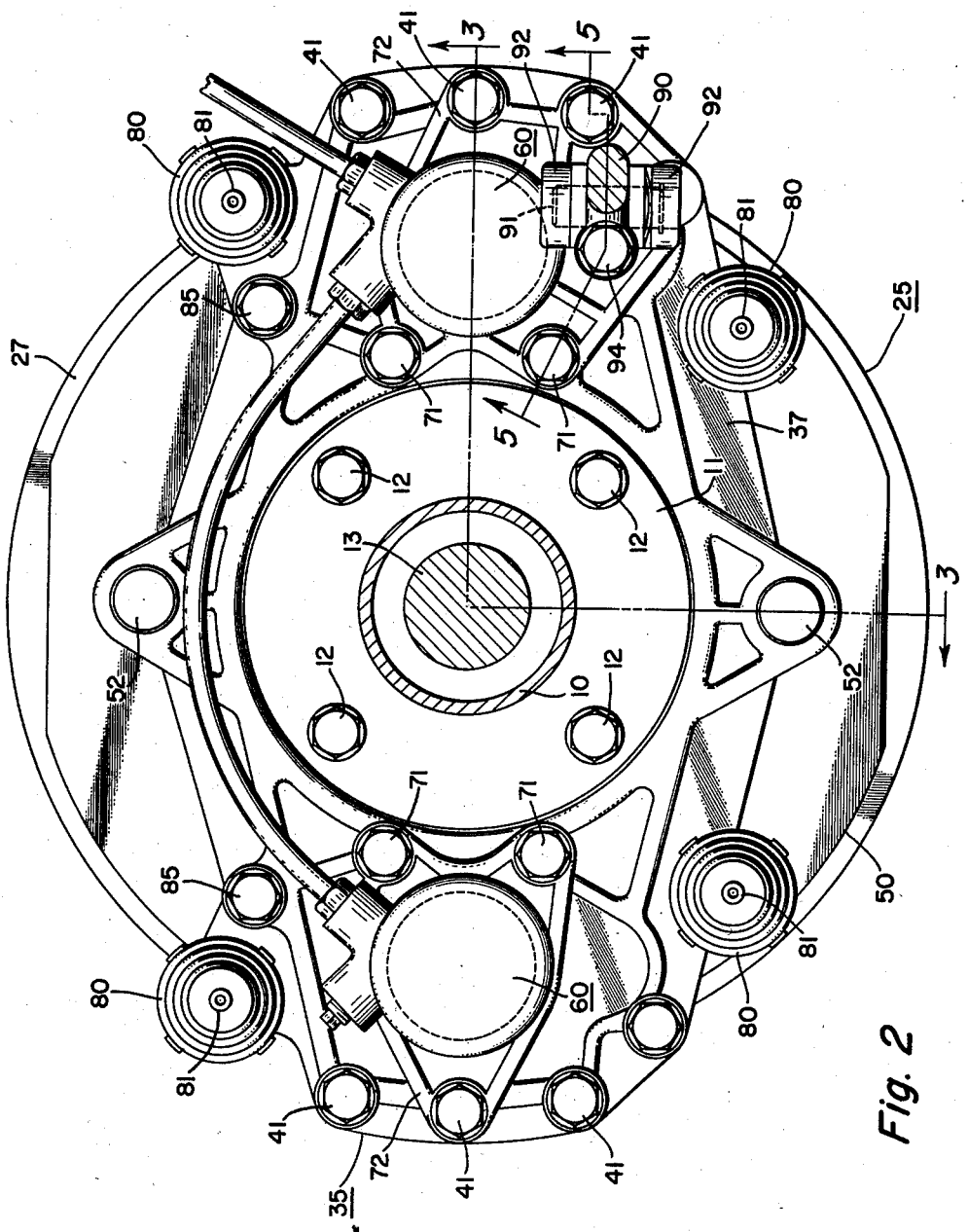
Figure 2 is a rear elevational view of the brake mechanism.

It will be noted from Figures 1 and 2 that the brake housing 35 is approximately twice as long as it is wide so that the brake disk 25 is enclosed by the end walls 38 and 39 whereas the sides of the brake housing are open to provide a through chamber 45 that receives the brake disk. The brake disk 25 is thus exposed to the atmosphere as it rotates within the housing 35 as driven by the wheel axle 13 through the drive links 22. Thus the exposure of the brake disk 25 to air movement that is passing by the wheel carrying the disk brake and air moving through the radial passages 44 provided internally of the brake disk provide for rapid dissipation of heat of friction during a brake application. With the surfaces 27 and 28 of the brake disk being disposed radially and exposed, any water or dirt that falls upon the disk 25 is centrifuged from the disk by its rotation so that the braking surfaces 27 and 28 remain relatively clean at all times.

The movable friction elements or shoes 30 are secured to the carrier plate 50 by means of suitable fastening studs 51, shown in Fig. 6. The carrier plate 50 is slidably supported upon a pair of anchor pins 52 that are supported on the rear wall 37 of the brake housing, as shown in Fig. 3. The anchor pins 52 are positioned 180° apart, as shown in Fig. 2. The carrier plate 50 is provided with a central opening 53 that allows removal of the plate over the wheel flange 15.

It will be seen from the description thus far that the brake disk 25 and the carrier plate 50 are each provided with limited axial movement relative to the axle 13 and the wheel hub 14, the drive links 22 being slidably supported on the pins 21 while the carrier plate 50 is slidably supported on the anchor pins 52. Thus when the movable shoes 30 are carried forward into engagement with the brake disk 25, the carrier plate 50 acts as a rigid plate to move both shoes concurrently into engagement with the brake disk and then move the brake disk into engagement with the stationary frictional elements or brake shoes 29.

As soon as the brake elements are engaged in a manner just described, rotation of the brake disk 25 will effect a torque reaction upon the carrier plate 50 through the brake shoes 30 whereby the carrier plate 50 will contact the anchor pins 52 with sufficient force as to resist axial sliding movement of the carrier plate on the anchor pins 52. At this time the hydraulically operated fluid motors 60 will cause deflection of the carrier plate 50 in an axial direction to effect pressure application between the friction elements 30, 29 and the brake disk 25. It will be noted that the fluid motors 60 are disposed 180° apart, and 90° from the anchor pins 52, as shown in Fig. 2. Thus the points of application of pressure from the fluid motors 60 is at a position of maximum remoteness from the anchor pins 52 whereby the carrier disk 50 can be flexed about the anchor pins 52 as an axis.

Each of the fluid motors 60 comprises an open ended cylinder 61 having a piston 62 slidable therein provided with a seal 63 between the piston and the cylinder bore 64. The piston 62 supports an actuating pin 65 that engages the removable shoe 30 in a socket 66 provided in the backing plate 67 for the shoe 30. Thus hydraulic fluid delivered into the cylinder space 68 will effect forward movement of the piston 62 to cause axial movement of the carrier plate 50 and the shoes 30 carried thereby into engagement with the brake disk 25 and then move the brake disk 25 into engagement with the shoes 29 carried on the brake housing 35.

A rubber-like diaphragm member 69 encloses the open end of the cylinder 61 to prevent entry of dirt and moisture into the cylinder bore 64.

Each of the fluid motors 60 extends through openings 70 in the rear wall 37 of the brake housing and are spaced from the wall to prevent conduction of heat into the wall of the cylinder 61. The cylinders 61 are secured to the brake housing by means of the bolts 71 and 41, the cylinder being provided with a flange 72 through which the bolts extend and provide minimum contact with the brake housing 35 to reduce to a maximum extent conduction of heat into the walls of the fluid motor 60. The fluid motors 60 are also exposed to the atmosphere and to the circulation of the air around the brake housing 35 to maintain the temperature of the hydraulic fluid in the cylinder space 68 to as low a temperature as possible.

The carrier plate 50 is maintained in a normal retracted position, as shown in Fig. 4, by means of retraction springs 80 that have one end supported upon the rear wall 37 of the brake housing and the opposite end engaging a pin 81 that extends through the rear wall 37 and through the carrier plate 50 with a head 82 being provided on the end of the pin 81 by which the expansive force of the spring 80 is transmitted to the carrier plate 50 to retain it in a retracted position against the adjusting screws 85.

Figure 7:
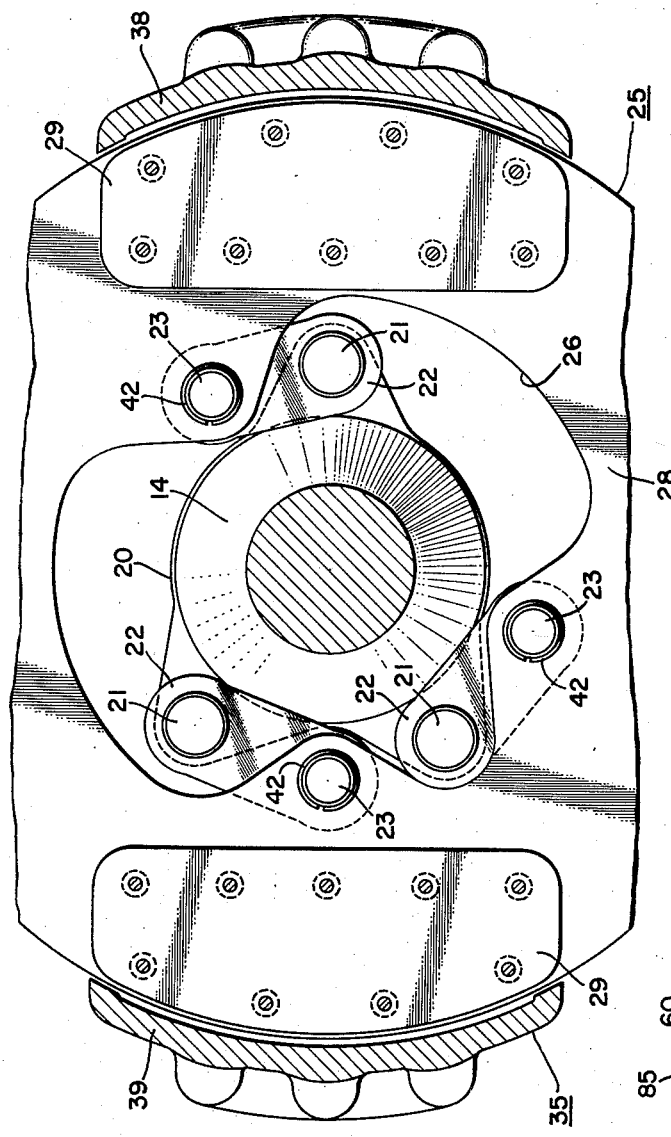
Figure 7 is a cross sectional view taken along line 7—7 of Figure 4.
Figure 8:
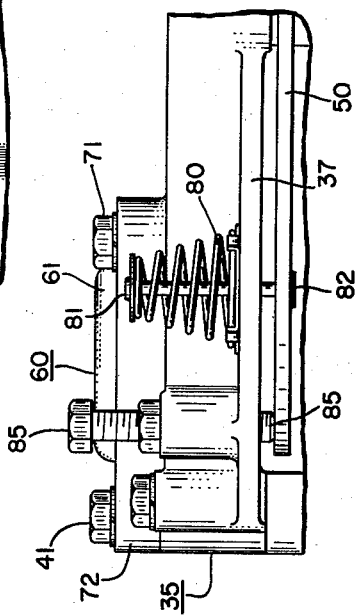
Figure 8 is an elevational view of a portion of the brake mechanism illustrating the retraction springs.

In Fig. 7 it will be noted that the opening 26 in the brake disk 25 is contoured to allow removal of the brake disk over the five pronged wheel flange 15 and removal of the links 22 from the drive pins 21 carried in the wheel flange 20, the configurations of the wheel flange 15 and of the opening 26 in the brake disk providing for a minimum diameter arrangement on which the drive links 22 can be placed tangentially relative to the axis of the axle 13.

In Figure 5 there is illustrated a parking brake arrangement to actuate the carrier 50 to move the movable shoes 30 into engagement with the brake disk 25 and then carry the brake disk into engagement with the shoes 29. The parking brake actuator comprises a lever 90 pivotally carried on a pin 91 supported in the ears 92 extending from the rear wall of the brake housing. The lever 90 is operated by means of a flexible cable 93 attached to a parking brake lever positioned within the passenger compartment of a motor vehicle. The lever 90 carries an adjusting screw 94 that engages a pin 95 guided within the boss 96 in the rear wall of the brake housing 35, the pin 95 in turn engaging the actuating plate 50. Thus when the lever 90 is rotated about the pivot pin 91, the pin 95 causes axial movement of the carrier plate 50 and thus effects engagement of the brake elements to provide a parking brake for the vehicle.

While the form of embodiment of the invention as herein disclosed constitutes a preferred form, it is to be understood that other forms might be adopted as may come within the scope of the claims which follow.

What is claimed is as follows:

1. In a disk brake, the combination of, a rotatable axle shaft, a floating brake disk, said shaft having a radially disposed flange provided with a plurality of axially extending mounting pins, a non-flexible mounting link extending between each of said pins and said disk and pivotally connected thereto, said links being movable axially on said pins to provide for axial movement of said disk, brake shoe pairs arranged at opposite sides of said disk one of which is movable, a floating semi-rigid carrier plate supporting the movable shoe pairs on one side of said disk, a housing structure partially enclosing said disk and carrier and supporting the stationary brake shoe pairs, an anchor pin on said housing peripherally intermediate said moveable shoe pairs and engaging said carrier plate to prevent rotation thereof, said plate being slidable axially on said anchor pin, and fluid actuated means on said housing connected separately with each of said moveable shoe pairs for movement of said plate with its supported moveable shoe pairs and said disk toward said stationary shoe pairs on said housing with said carrier plate effective as a rigid plate during sliding movement thereof on said anchor pin to effect initial frictional engagement of said moveable shoe pairs and disk and effective thereafter as a flexible plate during non-sliding movement of the plate on the anchor pin during a pressure brake application.

2. A brake mechanism, comprising, a brake support structure having a diametrical length substantially twice that of its diametrical width and including a front and rear wall axially spaced from one another and diametrically opposed end walls on the short width ends closing the said ends, said support structure having the longer length sides axially spaced and open between the said end walls whereby to provide an open sided chamber extending through the housing, a rotatable brake disk in said chamber having an axial opening, said disk extending through and being exposed beyond the said open sides of said support structure, an opening in said front wall coaxial with said opening in said disk, a rotatable axle shaft extending through all of said openings, a plurality of drive links between said shaft and said disk pivotally mounted on each, brake shoes arranged at opposite sides of said disk immediately adjacent each of said closing end walls with one of said shoes supported stationarily on one of said spaced walls and the other of said shoes being movable, a carrier plate within said chamber between said disk and the other of said spaced walls and supporting the movable shoe, an anchor pin on said support structure engaging said carrier plate to prevent rotation thereof, and brake actuating means on said support structure adjacent each of said closing end walls aligned axially with cooperating shoes and connected with said movable shoe for movement of said plate and supported shoe and said brake disk toward said stationary shoe to effect frictional engagement therebetween, said anchor pin being disposed circumferentially intermediate said actuating means.

3. A brake disk as set forth in claim 1 in which said housing structure includes a forward wall supporting said stationary shoe pairs and having an axial opening, said housing structure having a rearward wall axially spaced from said forward wall, said housing covering the outer periphery of said rotating brake disk only where said forward wall adjoins said rearward wall thereby permitting circulation of air for cooling of said brake disk.

References Cited in the file of this patent

UNITED STATES PATENTS

| | | |
|---|---|---|
| 2,105,867 | Stewart | Jan. 18, 1938 |
| 2,304,774 | Ash | Dec. 15, 1942 |
| 2,354,604 | Newell | July 25, 1944 |
| 2,732,036 | Myers | Jan. 24, 1956 |
| 2,753,959 | Johnson | July 10, 1956 |

FOREIGN PATENTS

| | | |
|---|---|---|
| 510,037 | Great Britain | July 26, 1939 |